US008380735B2

(12) United States Patent
Bushee et al.

(10) Patent No.: US 8,380,735 B2
(45) Date of Patent: *Feb. 19, 2013

(54) SYSTEM AND METHOD FOR EFFICIENT CONTROL AND CAPTURE OF DYNAMIC DATABASE CONTENT

(75) Inventors: William J. Bushee, Sioux Falls, SD (US); Thomas W. Tiahrt, Sioux Falls, SD (US)

(73) Assignee: Brightplanet Corporation II, Inc, Sioux Falls, SD (US)

( * ) Notice: Subject to any disclaimer, the term of this patent is extended or adjusted under 35 U.S.C. 154(b) by 238 days.

This patent is subject to a terminal disclaimer.

(21) Appl. No.: 12/648,088

(22) Filed: Dec. 28, 2009

(65) Prior Publication Data

US 2010/0174706 A1    Jul. 8, 2010

Related U.S. Application Data

(63) Continuation of application No. 11/633,673, filed on Dec. 4, 2006, now Pat. No. 7,676,555, which is a continuation of application No. 09/911,434, filed on Jul. 24, 2001, now Pat. No. 7,146,409.

(51) Int. Cl.
*G06F 7/00* (2006.01)
(52) U.S. Cl. ........................................ 707/769
(58) Field of Classification Search .................. None
See application file for complete search history.

(56) References Cited

U.S. PATENT DOCUMENTS

| 5,257,185 | A | 10/1993 | Farley et al. |
| 5,338,976 | A | 8/1994 | Anwyl et al. |
| 5,446,891 | A | 8/1995 | Kaplan et al. |
| 5,694,591 | A | 12/1997 | Du et al. |
| 5,721,902 | A | 2/1998 | Schultz |
| 5,761,497 | A | 6/1998 | Holt et al. |
| 5,778,363 | A | 7/1998 | Light |
| 5,822,731 | A | 10/1998 | Schultz |
| 5,826,031 | A | 10/1998 | Nielsen |
| 5,835,905 | A | 11/1998 | Pirolli et al. |
| 5,845,278 | A | 12/1998 | Kirsh et al. |
| 5,873,076 | A | 2/1999 | Barr et al. |

(Continued)

FOREIGN PATENT DOCUMENTS

| CA | 26156559 | 5/2007 |
| EP | 1808787 | 7/2007 |

(Continued)

OTHER PUBLICATIONS

Fielding et al., Network Working Group. Standard Track. Jan. 1997.

(Continued)

*Primary Examiner* — Belinda Xue
(74) *Attorney, Agent, or Firm* — Patterson Thuente Christensen Pedersen, PA

(57) ABSTRACT

A system and method for efficient control and capture of dynamic database content for rapidly providing a user with a highly relevant collection of documents related to a query. The system and method for efficient control and capture of dynamic database content includes a computer system with a storage means for facilitating the retention and recall of dynamic database content and a communications means for facilitating bi-directional communication of the computer system with local or distributed networks; an executory module operationally coupled to the computer system for controlling the storage means and the communications means as well as directing the system for the efficient control and capture of dynamic database content to a plurality of pre-selected Internet sites; and a capture module which is in communication with the executory module and facilitates selection of the plurality of Internet sites associated with a query submitted by a user of the system.

6 Claims, 8 Drawing Sheets

U.S. PATENT DOCUMENTS

| | | | |
|---|---|---|---|
| 5,940,834 A | 8/1999 | Pinard et al. |
| 5,983,216 A | 11/1999 | Kirsh et al. |
| 6,006,221 A | 12/1999 | Liddy et al. |
| 6,012,053 A | 1/2000 | Pant et al. |
| 6,018,733 A | 1/2000 | Kirsh et al. |
| 6,057,842 A | 5/2000 | Knowlton et al. |
| 6,067,539 A | 5/2000 | Cohen |
| 6,078,914 A | 6/2000 | Redfern |
| 6,112,202 A | 8/2000 | Kleinberg |
| 6,167,393 A | 12/2000 | Davis et al. |
| 6,175,830 B1 | 1/2001 | Maynard |
| 6,182,065 B1 | 1/2001 | Yeomans |
| 6,199,061 B1 | 3/2001 | Blewett et al. |
| 6,237,011 B1 | 5/2001 | Ferguson et al. |
| 6,247,010 B1 | 6/2001 | Dol et al. |
| 6,247,029 B1 | 6/2001 | Kelley et al. |
| 6,253,208 B1 | 6/2001 | Wittgreffe et al. |
| 6,278,993 B1 | 8/2001 | Kumar et al. |
| 6,282,537 B1 | 8/2001 | Madnick et al. |
| 6,321,228 B1 | 11/2001 | Crandall |
| 6,418,433 B1 | 7/2002 | Chakrabarti et al. |
| 6,418,440 B1 | 7/2002 | Kuo et al. |
| 6,424,980 B1 | 7/2002 | Iizuka et al. |
| 6,457,004 B1 | 9/2002 | Nishioka et al. |
| 6,463,430 B1 | 10/2002 | Brady et al. |
| 6,480,837 B1 | 11/2002 | Dutta |
| 6,510,427 B1 | 1/2003 | Bossemeyer et al. |
| 6,526,479 B2 | 2/2003 | Rosenzweig |
| 6,549,941 B1 | 4/2003 | Jaquith et al. |
| 6,553,364 B1 | 4/2003 | Wu |
| 6,564,210 B1 | 5/2003 | Korda et al. |
| 6,584,460 B1 | 6/2003 | Iwayama et al. |
| 6,654,734 B1 | 11/2003 | Mani et al. |
| 6,654,749 B1 | 11/2003 | Nashed |
| 6,665,666 B1 | 12/2003 | Brown et al. |
| 6,704,729 B1 | 3/2004 | Klein et al. |
| 6,711,569 B1 | 3/2004 | Bushee |
| 6,718,365 B1 | 4/2004 | Dutta |
| 6,745,161 B1 | 6/2004 | Arnold et al. |
| 6,751,600 B1 | 6/2004 | Wolin |
| 6,757,866 B1 | 6/2004 | Dey et al. |
| 6,782,380 B1 | 8/2004 | Thede |
| 6,782,387 B1 | 8/2004 | Kumashio |
| 6,804,677 B2 | 10/2004 | Shadmon et al. |
| 6,816,175 B1 | 11/2004 | Opalka et al. |
| 6,920,448 B2 | 7/2005 | Kincaid et al. |
| 6,922,699 B2 | 7/2005 | Schuetze et al. |
| 6,968,338 B1 | 11/2005 | Gawdiak et al. |
| 6,990,670 B1 | 1/2006 | Hodjat |
| 7,016,910 B2 | 3/2006 | Egilsson et al. |
| 7,043,487 B2 | 5/2006 | Krishnamurthy et al. |
| 7,146,409 B1 | 12/2006 | Bushee et al. |
| 7,181,438 B1 * | 2/2007 | Szabo ........... 1/1 |
| 7,240,045 B1 | 7/2007 | Bushee |
| 7,249,122 B1 | 7/2007 | Bushee et al. |
| 7,454,430 B1 | 11/2008 | Komissarchik et al. |
| 7,581,170 B2 | 8/2009 | Baumgartner et al. |
| 7,908,260 B1 | 3/2011 | Bushee |
| 2001/0037324 A1 | 11/2001 | Agrawal et al. |
| 2001/0051958 A1 | 12/2001 | deVries et al. |
| 2001/0056414 A1 | 12/2001 | Christal et al. |
| 2002/0007374 A1 | 1/2002 | Marks et al. |
| 2002/0078090 A1 | 6/2002 | Hwang et al. |
| 2002/0099723 A1 | 7/2002 | Garcia-Chiesa |
| 2002/0120598 A1 | 8/2002 | Shadmon et al. |
| 2003/0009439 A1 | 1/2003 | Lee |
| 2003/0078766 A1 | 4/2003 | Appelt et al. |
| 2003/0088544 A1 | 5/2003 | Kan et al. |
| 2003/0126120 A1 | 7/2003 | Faybishenko et al. |
| 2003/0145022 A1 | 7/2003 | Dingley |
| 2003/0158839 A1 | 8/2003 | Faybishenko et al. |
| 2003/0177111 A1 | 9/2003 | Egendorf et al. |
| 2003/0212737 A1 | 11/2003 | Moricz et al. |
| 2003/0225757 A1 | 12/2003 | Evans et al. |
| 2004/0172601 A1 | 9/2004 | Rettig et al. |
| 2004/0230566 A1 | 11/2004 | Balijepalli et al. |
| 2004/0230571 A1 | 11/2004 | Robertson |
| 2004/0249682 A1 | 12/2004 | Demarcken et al. |
| 2005/0010556 A1 | 1/2005 | Phelan |
| 2005/0055355 A1 | 3/2005 | Murthy et al. |
| 2005/0228786 A1 | 10/2005 | Murthy et al. |
| 2006/0053091 A1 | 3/2006 | Dumitru et al. |
| 2006/0059184 A1 | 3/2006 | Narsude |
| 2006/0161564 A1 | 7/2006 | Pierre et al. |
| 2006/0224579 A1 | 10/2006 | Zheng |
| 2006/0277168 A1 | 12/2006 | Hammond et al. |
| 2007/0027839 A1 | 2/2007 | Ives |
| 2007/0027850 A1 | 2/2007 | Chan et al. |
| 2007/0027901 A1 | 2/2007 | Chan et al. |
| 2007/0050393 A1 | 3/2007 | Vogel et al. |
| 2007/0055745 A1 | 3/2007 | Moricz |
| 2007/0067297 A1 | 3/2007 | Kublickis |
| 2007/0078814 A1 | 4/2007 | Flowers et al. |
| 2007/0156660 A1 | 7/2007 | Moricz |
| 2007/0168335 A1 | 7/2007 | Moore et al. |
| 2007/0214048 A1 | 9/2007 | Chan et al. |
| 2008/0040326 A1 | 2/2008 | Chang et al. |
| 2008/0040327 A1 | 2/2008 | Chang et al. |
| 2008/0259084 A1 | 10/2008 | Chang et al. |
| 2008/0270367 A1 | 10/2008 | Chang et al. |
| 2009/0024613 A1 | 1/2009 | Niu et al. |
| 2009/0077180 A1 | 3/2009 | Flowers et al. |
| 2009/0204610 A1 | 8/2009 | Hellstrom et al. |
| 2010/0029933 A1 | 2/2010 | Patil et al. |
| 2010/0057686 A1 | 3/2010 | Breiner et al. |
| 2010/0057695 A1 | 3/2010 | Kirovski et al. |
| 2010/0235178 A1 | 9/2010 | Firminger et al. |
| 2010/0235183 A1 | 9/2010 | Firminger et al. |
| 2010/0235186 A1 | 9/2010 | Firminger et al. |
| 2010/0235188 A1 | 9/2010 | Firminger et al. |
| 2010/0235191 A1 | 9/2010 | Firminger et al. |
| 2010/0235195 A1 | 9/2010 | Firminger et al. |
| 2010/0257466 A1 | 10/2010 | Wroblewski et al. |
| 2010/0299331 A1 | 11/2010 | Moricz |
| 2010/0306047 A1 | 12/2010 | Hentrich, Jr. et al. |
| 2011/0087646 A1 | 4/2011 | Dalvi et al. |
| 2011/0179074 A1 | 7/2011 | Lee et al. |
| 2011/0191309 A1 | 8/2011 | Anderson et al. |
| 2011/0270820 A1 | 11/2011 | Agarwal |
| 2011/0276427 A1 | 11/2011 | McNall et al. |
| 2011/0307451 A1 | 12/2011 | El Haddi et al. |
| 2011/0313995 A1 | 12/2011 | Lederman et al. |

FOREIGN PATENT DOCUMENTS

| | | |
|---|---|---|
| EP | 2169565 | 3/2010 |
| JP | 11224256 | 8/1999 |
| JP | 11224292 | 8/1999 |
| WO | WO 9204681 | 3/1992 |
| WO | WO 9712333 | 4/1997 |
| WO | WO9857279 | 12/1998 |
| WO | WO9934336 | 7/1999 |
| WO | WO02091107 | 11/2002 |
| WO | WO02091239 | 11/2002 |
| WO | WO03083643 | 10/2003 |
| WO | WO2005001717 | 1/2005 |
| WO | WO2007012887 | 2/2007 |
| WO | WO2007052285 | 5/2007 |
| WO | WO2008058247 | 5/2008 |
| WO | WO2010038006 | 4/2010 |
| WO | WO2010082207 | 7/2010 |
| WO | WO2011042889 | 4/2011 |
| WO | WO2011064756 | 6/2011 |
| WO | WO2011143241 | 11/2011 |

OTHER PUBLICATIONS

Elliotte Rusty Harold, JAVA Network Programming, Second Edition.
Sunayama et al., "Search Interface for Query Restructuring with Discovering User Interest", 1999. pp. 538-541.
Ntoulas et al., "Downloading Textual Hidden Wed Content Through Keywords Queries", 2005. pp. 100-109.
Powell et al., "Multilingual Federated Searching Across Heterogeneous Collections", D-Lib Magazine. ISSN 1082-9873 Sep. 1998. pp. 1-11.
Kikui et al., "Cross-lingual Information Retrieval on the WWW", Multilinguality in Software Engineering: AI Contribution (in conjunction with ECAI 96).1996. pp. 1-6.

Hull, "Using Structured Queries for Disambiguation in Cross-Language Information Retrieval", Rank Xerox Research Centre. Jun. 23, 1997. 11 pages.

Hawking, "Web Search Engines: Part 2", How Things Work, Jun. 2006, pp. 86-88).

Cheng et al, "Translating Unknown Queries with Web Corpora for Cross-Language Information Retrieval", Institute of Information Science, Academia Sinica, Taiwan 2004. 8 pages.

Fan et al., "Tapping the Power of Text Mining", Communications of the ACM. Sep. 2006. vol. 49. No. 9. pp. 77-82.

McRae-Spencer, et al., "Semiometrics: Applying Ontogoloes across Large-Scale Digital Libraries", School of Electronics and Comuter Science. Highfield, Southhampton.

Lu et al, "Towards Web Mining of Query Translations for Cross-Language Information Retrieval in Digital Libraries", Institute of Infomration Science, Academia Sinica. 12 pages.

Hu et al., "Improving Query Translation for Cross-Language Infromation Retrieval using a Web-based Approach", 2004. 8 pages.

Technology White Paper, Semetric®: Conceptual Search and Discovery. NIUM. Engenium Corporation.

Shadbolt et al., "The Semantic Web Revisited" IEEE Intelligent Systems. May/Jun. 2006. pp. 96-101.

Olsen, Spying an Intelligent Search Engine. www.news.com dated Aug. 21, 2006. Copyright 1995-2006 CNET Networks, Inc.

Wang, "Matching Meaning for Cross-Language Information Retrieval" Dissertation Directed by: Professor Douglas W. Oard. 2005 (Abstract).

Application and File History of U.S. Patent No. 6,711,569 issued Mar. 23, 2004, Inventors Bushee et al.

Application and File History of U.S. Appl. No. 10/777,711, filed Feb. 12, 2004, Inventors Bushee et al.

Application and File History of U.S. Patent No. 7,249,122, issued Jul. 24, 2007, inventors Bushee et al.

Application and File History of U.S. Patent No. 7,146,409, issued Dec. 5, 2006, Inventors Bushee et al.

Application and File History of U.S. Patent No. 7,676,555, issued Mar. 9, 2010, Inventors Bushee et al.

Application and File History of U.S. Appl. No. 09/911,433, filed Jul. 24, 2001, Inventor Tiahrt.

Application and File History of U.S. Patent No. 7,240,045, filed Jul. 3, 2007, Inventors Bushee et al.

Application and File History of U.S. Appl. No. 12/006,241, filed Dec. 31, 2007, Inventor Bushee.

Application and File History of U.S. Appl. No. 12/012,612, filed Feb. 4, 2008, Inventors Bushee et al.

* cited by examiner

| Record Related Information | | | | | |
|---|---|---|---|---|---|
| Offset Segment | Length Segment | Last Time Checked Segment | Hits Segment | Highest Score Segment | Database Segment |
| 0 | 0 | 0 | 0 | 0 | 0 |
| 1 | 1 | 1 | 1 | 1 | 1 |
| 2 | 2 | 2 | 2 | 2 | 2 |
| 3 | 3 | 3 | 3 | 3 | 3 |
| N-1 | N-1 | N-1 | N-1 | N-1 | N-1 |
| N | N | N | N | N | N |

Figure 7

SYSTEM AND METHOD FOR EFFICIENT CONTROL AND CAPTURE OF DYNAMIC DATABASE CONTENT

RELATED APPLICATIONS

This application is a continuation of U.S. application Ser. No. 11/633,673 filed Dec. 4, 2006, now U.S. Pat. No. 7,676,555 which claims priority to U.S. application Ser. No. 09/911,434 filed Jul. 24, 2001, now U.S. Pat. No. 7,146,409 (issued Dec. 5, 2006).

INCORPORATION BY REFERENCE

This patent application discloses an invention which may optionally form a portion of a larger system. Other portions of the larger system are disclosed and described in the following co-pending patent applications, all of which are subject to an obligation of assignment to the same person. The disclosures of these applications are herein incorporated by reference in their entireties.

METHOD AND SYSTEM FOR AUTOMATIC HARVESTING AND QUALIFICATION OF DYNAMIC DATABASE CONTENT, William J. Bushee, Thomas W. Tiahrt, and Michael K. Bergman, and Filed Jul. 24, 2001, application Ser. No. 09/911,522, now U.S. Pat. No. 7,249,122.

METHOD FOR AUTOMATIC SELECTION OF DATABASES FOR SEARCHING, William J. Bushee, Filed Jul. 24, 2001, application Ser. No. 09/911,452 now U.S. Pat. No. 6,711,569.

AUTOMATIC SYSTEM FOR CONFIGURING TO DYNAMIC DATABASE SEARCH FORMS, William J. Bushee, Filed Jul. 24, 2001, application Ser. No. 09/911,435 now U.S. Pat. No. 7,240,045.

BACKGROUND OF THE INVENTION

1. Field of the Invention

The present invention relates to search engines and more particularly pertains to a new system and method for efficient control and capture of dynamic database content for rapidly providing a user with a highly relevant collection of documents related to a query.

2. Description of the Prior Art

The Internet is a worldwide system of computer networks in which users at any one computer may get information located on virtually any other computer with appropriate authorization. The Internet uses a set of protocols called Transmission Control Protocol/Internet Protocol or TCP/IP. The World Wide Web (often abbreviated as WWW) is a portion of the Internet using hypertext as a method for rapid cross-referencing that links one document or site to another.

A database is a collection of data, which is organized in a manner that allows its contents to be easily accessed, managed, and updated. Given this definition an Internet site can be viewed as a database with a collection of data that can be viewed as pages, or accessible documents. Similarly, any network for accessing documents can be considered a database, including intranets and extranets. These network databases can be either static or dynamic. A static network database provides the same set of documents or pages to every user. A dynamic network database presents unique documents or pages to different users, typically as a response to the users' queries.

The use of search engines is known in the prior art. The Internet, as well as the predecessor ARPANET, has since its inception held the promise of real-time access to an almost inexhaustible supply of information, stored on computers throughout the world. Sorting through the information available to find documents relevant to a given question or query can be laborious; and a method to speed this process is needed. Search engines allow a user to search for sites that have one or more keywords corresponding to the user's query. This development has sped up the process of finding sites, but has not necessarily improved the quality of the results. While it is true that millions of documents are readily available as static pages to users through search engines, much more of the total content of the Internet has remained in the shadows. This remaining content, while available, often requires independent knowledge of the exact location of the document, sophisticated search techniques, or in many cases the use of professional researchers to attempt to "mine" the needed information.

Search engines have been improved through the use of link-followers also known as "crawlers", which allow a search engine to follow links on a known web page to discover other web pages as new sources of information and to build an index. Crawlers are an improvement over conventional search engines in that they can provide more sites that are relevant to a given question or query. But again, as was the case with conventional search engines, only static pages have been available as results to the user. Some of the static pages may be entry-points for databases, which can provide very relevant and detailed information by continued searching. However the use of these entry points conventionally requires the laborious task of manually entering the user's question in the specific data-entry windows for each database, capturing the results, and then analyzing the results from each database for relevancy.

SUMMARY OF THE INVENTION

In view of the foregoing disadvantages inherent in the known types of search engines now present in the prior art, the present invention provides a new system and method for efficient control and capture of dynamic database content construction wherein the same can be utilized for rapidly providing a user with a highly relevant collection of documents related to a query.

The present invention generally comprises a computer system with a storage means for facilitating the retention and recall of dynamic database content and a communications means for facilitating bi-directional communication of the computer system with local or distributed networks. An executory module is operationally coupled to the computer system for controlling the storage means and the communications means as well as directing the system for the efficient control and capture of dynamic database content to a plurality of pre-selected Internet sites. A capture module is in communication with the executory module and facilitates selection of the plurality of Internet sites associated with a query submitted by a user of the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a schematic diagram of the record related information portion of the present invention.

DESCRIPTION OF THE PREFERRED EMBODIMENT

Figure 1A:
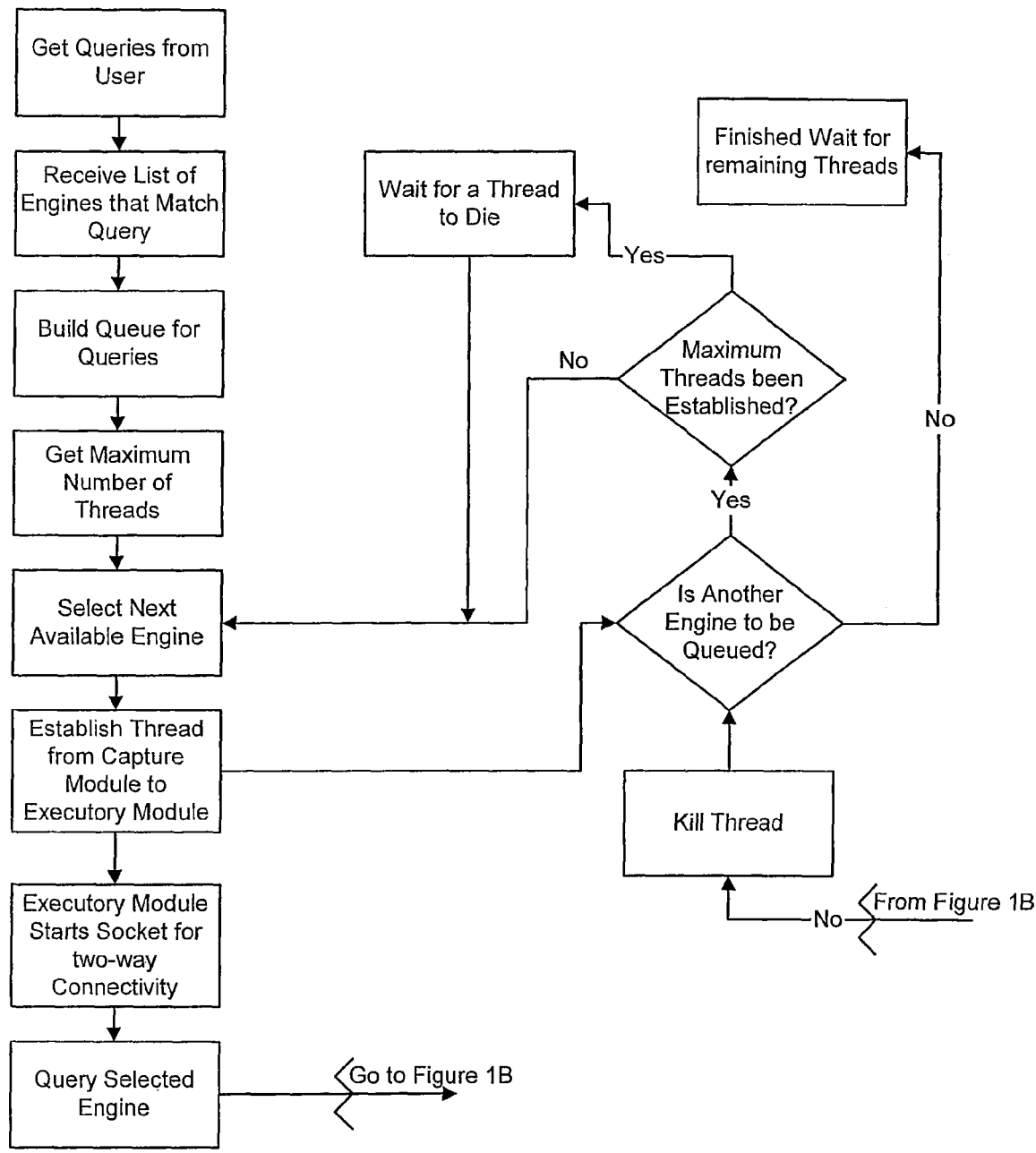
FIG. 1A is a schematic flow diagram of a first portion of a new method for efficient control and capture of dynamic database content according to the present invention.
Figure 1B:
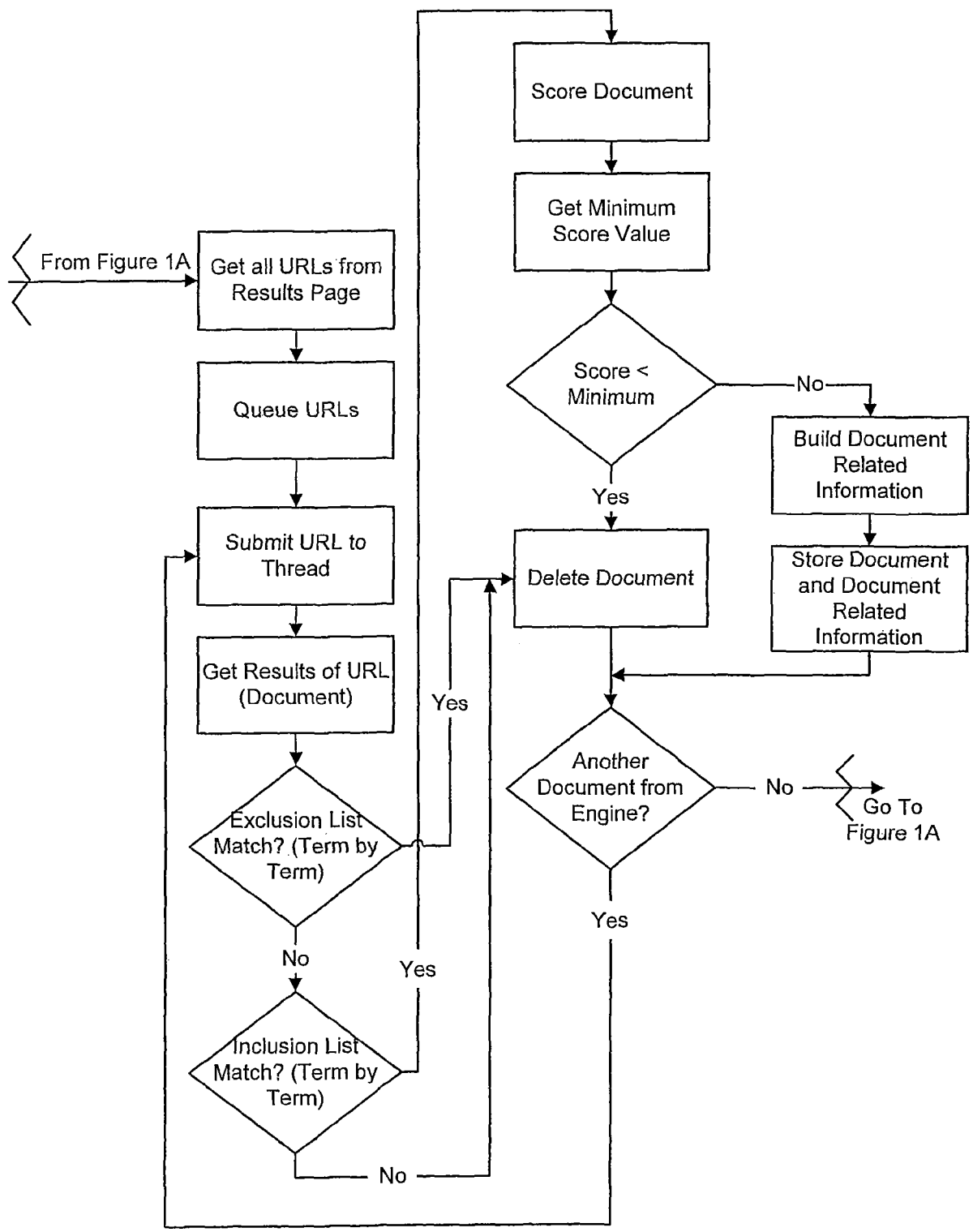
FIG. 1B is a schematic flow diagram of a second portion of the method for efficient control and capture of dynamic database content according to the present invention.
Figure 2:
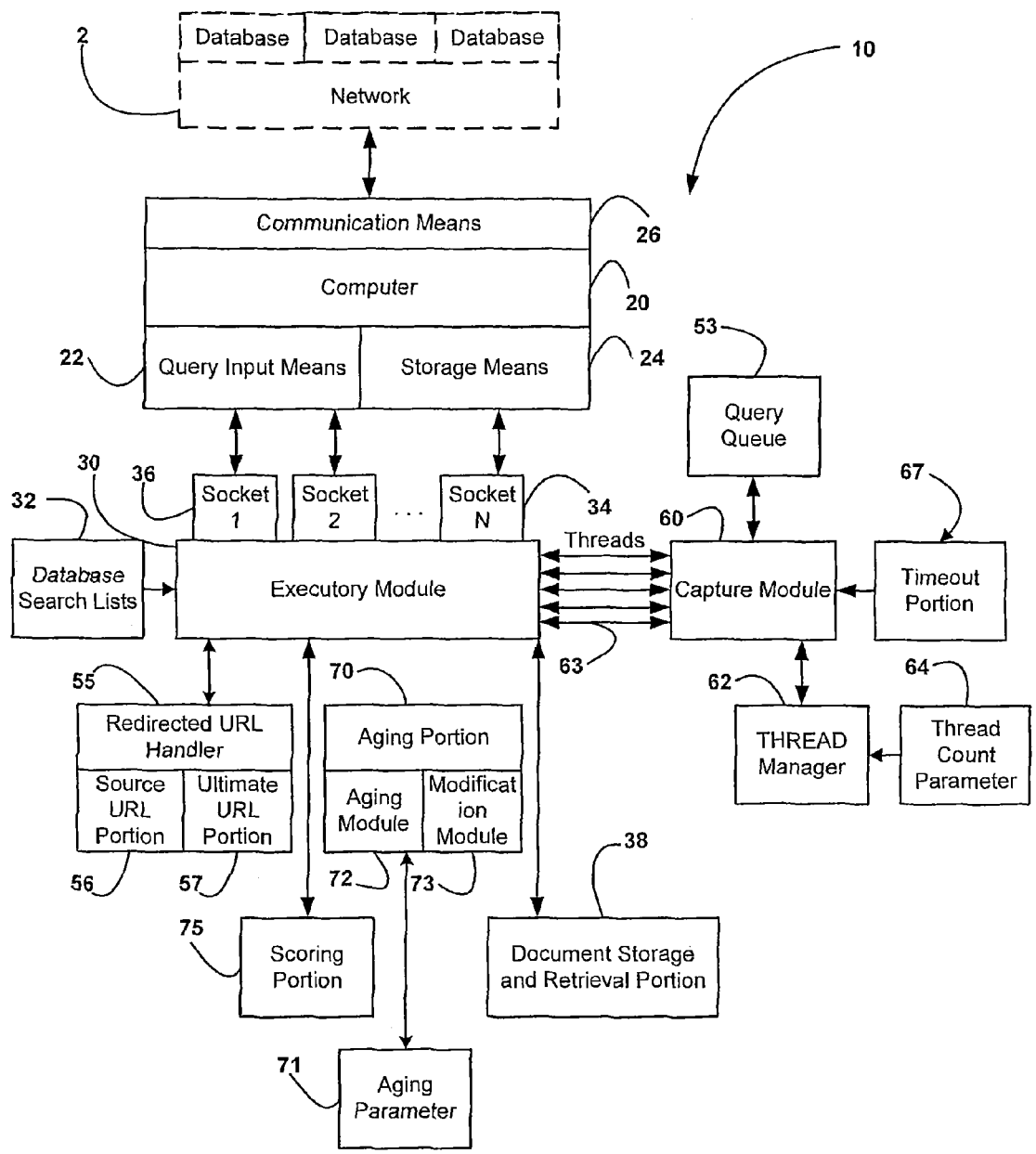
FIG. 2 is a schematic functional interconnect flow diagram of the present invention.
Figure 3:
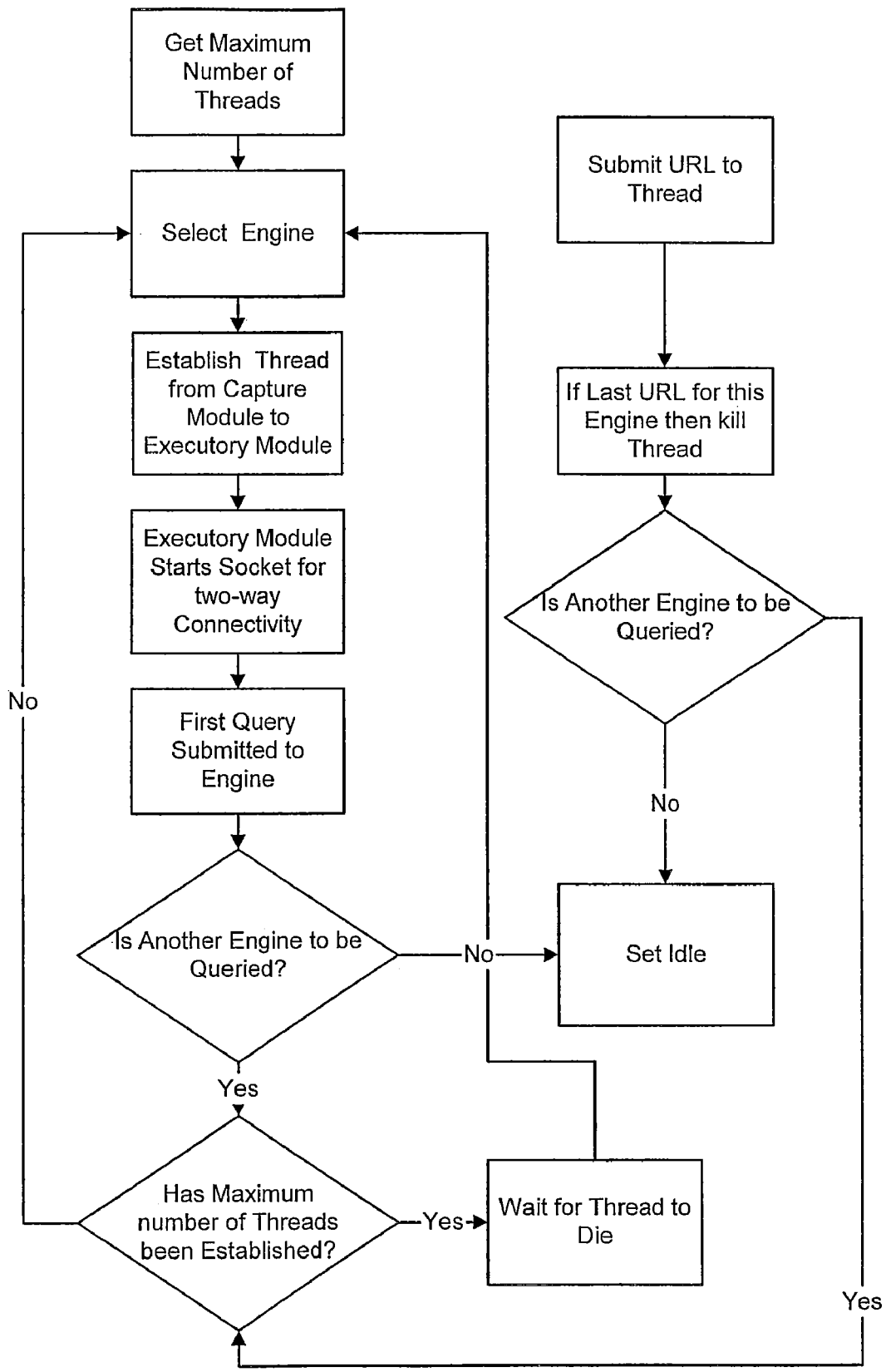
FIG. 3 is a schematic flow diagram of the thread handler portion of the present invention.
Figure 4:
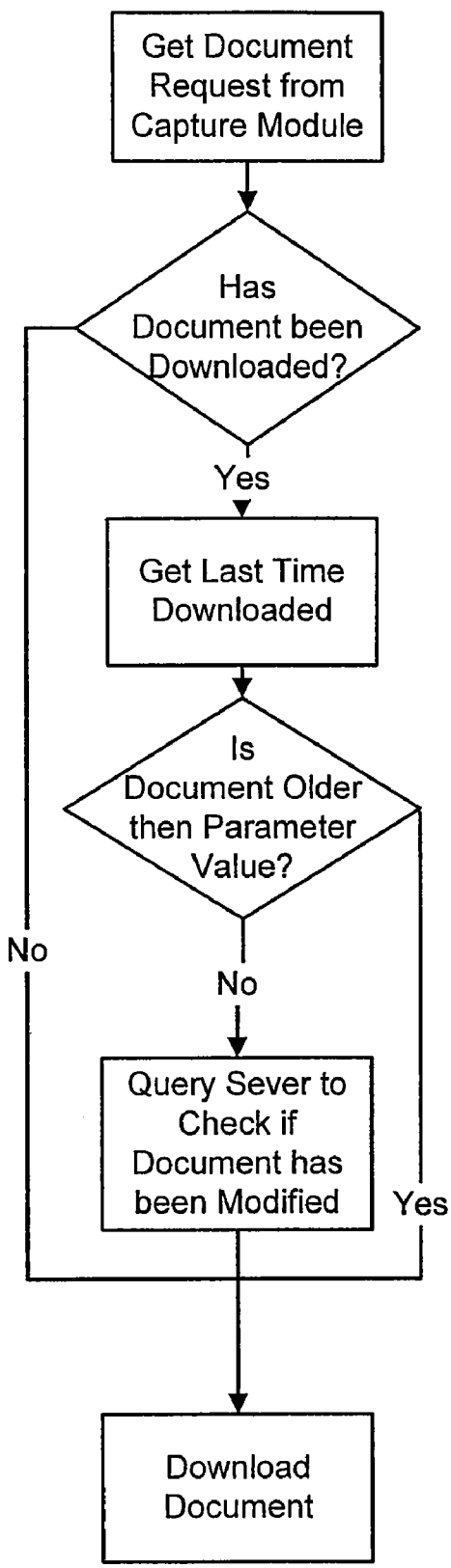
FIG. 4 is a schematic flow diagram of the aging handler portion of the present invention.
Figure 5:
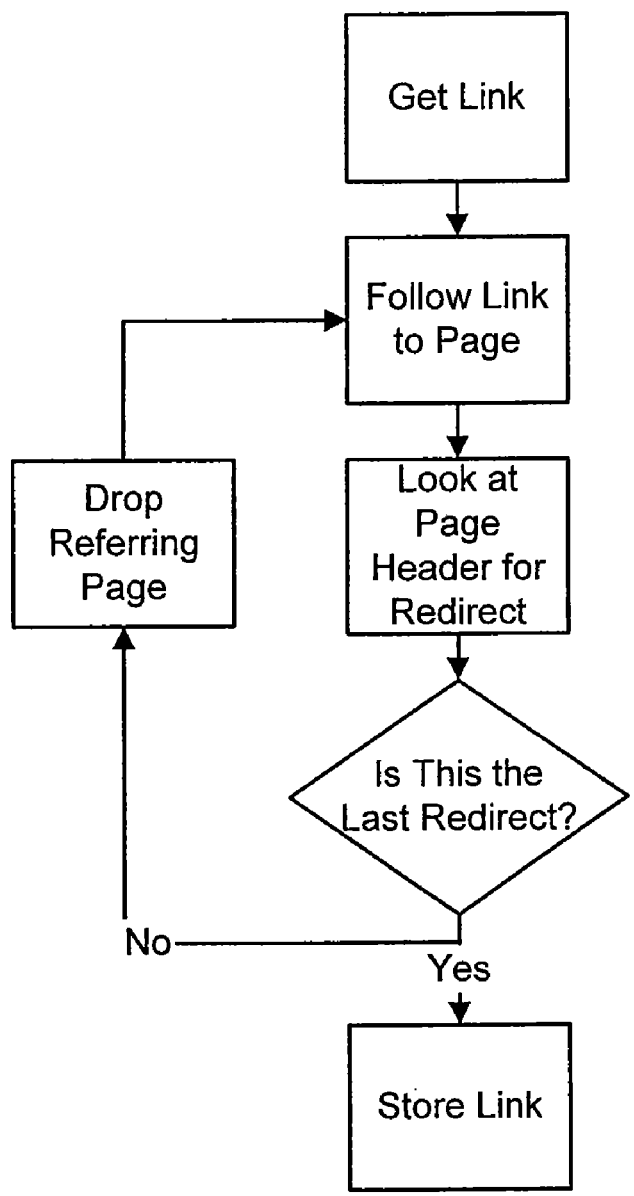
FIG. 5 is a schematic flow diagram of the URL redirect handler portion of the present invention.
Figure 6:
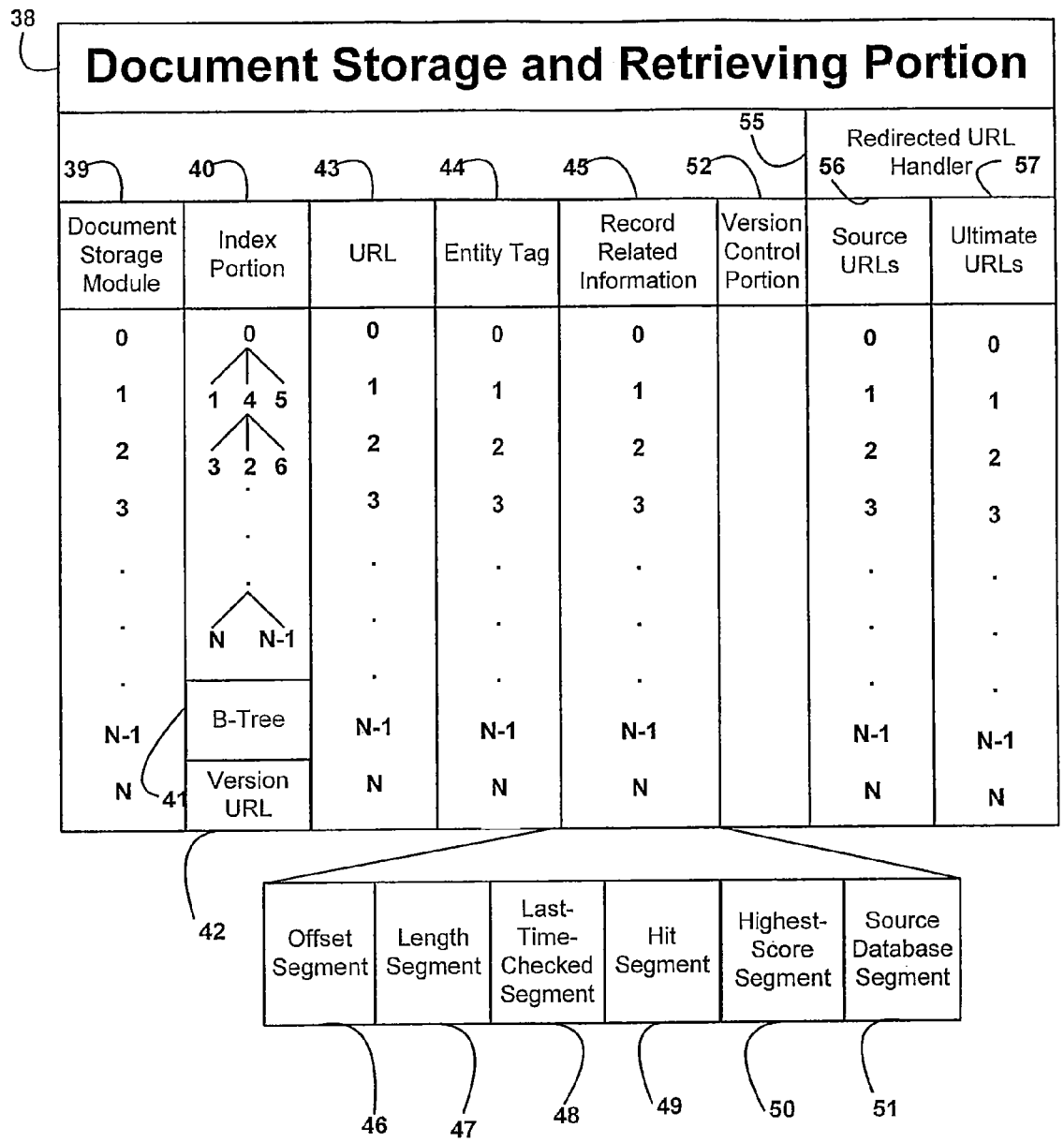
FIG. 6 is a schematic diagram of the document storage and retrieval portion of the present invention.

With reference now to the drawings, and in particular to FIGS. 1 through 7 thereof, a new system and method for efficient control and capture of dynamic database content embodying the principles and concepts of the present invention will be described.

As best illustrated in FIGS. 1 through 7, the system 10 for efficient control and capture of dynamic database content generally comprises a computer system 20, an executory module 30, a capture module 60, and a query input means 22.

The computer system 20 includes a storage means 24 for facilitating retention and recall of dynamic database content. The computer system 20 also includes a communications means 26 for facilitating bi-directional communication of the computer system 20 with networks such as local networks, commonly referred to as intranets, and distributed networks, which may include extranets and the Internet.

The executory module 30 of the system 10 is interfaced to the computer system 20 and controls the storage means 24 and the communications means 26. The executory module 30 directs the system to a plurality of pre-selected network sites or databases 2. Hereinafter, references to "databases" should be understood to include sites on intranets and the Internet separate from the system 10.

The capture module 60 of the system 10 is in communication with the executory module 30 and facilitates selection of the plurality of network databases 2 that are associated with a query submitted by a user of the system 10.

The system 10 may include query input means 22 for receiving a query, or a plurality of queries, from a user. The query input means 22 may transfer the plurality of queries (received from the user) to the capture module 30.

In one embodiment of the invention, the query input means 22 comprises an input module. The input module may comprise, for example, a keyboard, a mouse, a data input device capable of converting action of a user to a machine readable query, a data file transferred as one or more electrical signals to the computer system 20, a data file transferred as one or more optical signal to the computer system 20, a data file written to memory in the computer system 20 accessible by the capture module 60, and a data file written to a storage medium accessible by the capture module 60.

A database search listing 32 may be included to provide the capture module 60 with a listing of a plurality of pre-selected databases 2 to which user defined queries may be submitted.

The database search listing 32 may further comprise at least one field that conveys information for formatting of a query to be submitted to at least one of the plurality of pre-selected databases 2.

The executory module 30 may further comprise a network connectivity portion 34 for establishing and maintaining bi-directional connectivity between the computer system 20 and networks (such as the Internet) to facilitate the transmittal of at least one query to at least one site on a network. The network connectivity portion 34 may also establish and maintain bi-directional connectivity between the computer system 10 and a local network (such as an intranet) to allow queries from a user to be directed at both external databases (Internet) and internal databases (intranet). The network connectivity portion 34 may use a plurality of sockets 36 to establish and maintain bi-directional connectivity with the network.

The executory module 30 may further comprise a document storage and retrieval portion 38 for retaining documents. The documents in the document storage and retrieval portion may comprise documents that have been returned in reply to one of the plurality of queries submitted to each associated one of the plurality of databases 2. The documents are thus saved on the system at a location that is separate and distinct from the source site on the network from where the document was retrieved.

The document storage and retrieval portion 38 may further comprise a document storage module 39 for retaining each one of a plurality of documents as part of an indexed array for facilitating rapid retrieval of a document by the user. A document may be a web page, or an accessible file in a variety of formats. Illustrative examples of these formats include, but are not limited to, text, HTML, and PDF files.

Significantly, the document storage module 39 stores each one of the plurality of documents as part of a binary stream of data. The entire collection of documents in the document storage is stored in a single file. Each one of the plurality of documents is separately and individually accessible.

The document storage and retrieval portion 38 may further comprise an index portion 40 for recording the stored location of each document in the document storage module for facilitating rapid recall of any one of the plurality of documents from the document storage module 39. The index portion 40 may further comprise a B-tree 41 and a plurality of core version uniform resource locators 42 (URLs).

The B-tree 41 is used as an indexing structure for the plurality of documents. A B-tree 41 is a method of placing and locating files in a database. The use of a B-tree 41 minimizes the number of steps necessary to locate a desired document. As an example, if a database were to be stored on a disk drive the use of a B-tree 41 would minimize the number of times that the drive would have to be accessed to get a specific document. In a B-tree 41, decision points are called nodes. Every node has between t−1 and 2t−1 children or branches, where t is an arbitrary constant. This is a preferred structure for minimizing the time required to access a specific document; because the height of the tree, and therefore the number of accesses, can be kept small by picking a large value for t. In other words, more branches extending from each node creates a flatter but broader tree, and fewer steps are required to get to a specific document.

A URL is the address of a file or document which is accessible on the Internet. The URL contains the name of the protocol required to access the file or document, such as "ftp" or "http"; a domain name which identifies the specific computer on the network which has the file or document; and a hierarchical description of the location of the file or document on that specific computer.

The plurality of core version uniform resource locators 42 provide a path back to a source document from an associated one of the databases 2 on a source site of the network. This part permits reestablishment of a connection with the database 2 which provided the source document and allows the database 2 to be analyzed by the user.

A core version of the URL is essentially a URL that is common to all of the extended variations of a URL which lead to the same document or page on a source site. As an illustrative example, a document may be found at a URL of "http://www.generic_example.com". This same document may also be accessible through additional URLs such as: "http://generic_example.com"; "http://generic_example.com/"; or "http://generic_example.com\index.asp". Illustratively, for the above variations, the core version for this document may be "generic_example.com".

The document storage and retrieval portion 38 may further comprise a uniform resource locator module 43, an entity tag portion 44, a record related information portion 45, and a version control portion 52. The uniform resource locator module 43 is used for retaining a uniform resource locator for each one of the plurality of documents returned by each one of the plurality of databases 2. The entity tag portion 44 is used for retaining an entity tag for each one of the plurality of documents returned by each one of the plurality of databases 2. Entity Tags are defined in the Hyper-Text Transfer Protocol version 1.1.

The record related information portion 45 contains parametric information associated with each one of the plurality of documents. The record related information portion 45 facilitates analysis of each one of the plurality of documents.

The record related information portion 45 may comprise a plurality of segments, including offset segments 46, length segments 47, last-time-checked segments 48, hit segments 49, highest-score segments 50, and database segments 51 for each document in the document storage module.

The offset segments 46 for a document represent a starting point for the document in the document storage module. The length segment 47 for a document represents a length of the document in the document storage module. The last-time-checked segment 48 for a document represents the time of the last known occurrence of collecting the document from its network site of origin. The hit segment 49 for a document represents the number of previous requests received by the document storage module for the document. The highest-score segment 50 for a document represents the best results obtained for the document compiled through use of an arithmetic scoring operation. The database segment 51 for a document represents the search engine used to locate the document.

In one embodiment, each one of the plurality of offset segments 46, length segments 47, last-time-checked segments 48, hits segments 49, highest-score segments 50, and database segments 51 comprises a 32 bit representation. Each one of the segments may be stored as part of an array. Each one of the offset segments 46 includes a one to one correspondence with an index portion. The index portion links a stored version of each document with the associated parametric information. Optionally, each one of the plurality of offset segments 46, length segments 47, last-time-checked segments 48, hits segments 49, highest-score segments 50, and database segments 51 may comprise a 64 bit representation which facilitates accessibility of larger file constructs through increased addressing capabilities.

The version control portion 52 of the document storage and retrieval portion is used for recording version identification for the document storage and retrieval portion 38. The version control portion 52 allows the user to verify configuration attributes such a version number or build date of the document storage and retrieval portion 38.

A query queue 53 is used to hold each one of the plurality of queries from the query input means 22 until each one of the queries is transferred to the executory module 30.

The capture module 60 uses a plurality of threads 63 to transfer queries from the capture module to the executory module 30 to thereby establish multiple coexisting sequential flows of control between the capture module 60 and the executory module 30.

A thread manager 62 is used for the creation, management, and termination of the plurality of threads 63 between the capture module 60 and the executory module 30. Each one of the plurality of threads 63 transmits a query from the capture module 60 to the executory module 30 and transmits a reply received through one of the sockets 36 from a database 2 from the executory module 30 to the capture module 60.

The thread manager 62 terminates one of the sockets 36 when a database 2 has completed responses to an associated series of queries. Thus, each thread 63 terminates upon completion of queries and responses associated with a single database 2.

The thread manager 62 may further comprise a simultaneous thread count parameter 64, a thread creation and termination portion 65, and a plurality of monitoring portions 66.

The simultaneous thread count parameter 64 contains a value received from the executory module 30. The simultaneous thread count parameter value is used by the thread manager 62 to set an upper bound for a number of simultaneously coexisting threads 63 forming the plurality of threads 63.

The thread creation and termination portion 65 interacts with an operating system for generating a thread 63 associated with one of the databases 2 to be queried.

Each one of the plurality of monitoring portions 66 is associated with one of the plurality of threads 63. The monitoring portion 66 determines a termination point when all responses associated with each one of the plurality of queries directed to one of the plurality of databases 2 have been returned. The thread creation and termination portion 65 terminates one of the plurality of threads 63 when the termination point is reached by the monitoring portion 66 associated with the one of the plurality of databases 2.

The thread creation and termination portion 65 is operationally linked to the database search listing 32. The thread creation and termination portion 65 generates a new thread 63 if additional databases 2 are to be queried and the simultaneous thread count parameter 64 has not been reached.

The thread manager 62 also includes a timeout portion 67 for determining a termination point for use by the thread creation and termination module 65 when a database 2 being queried fails to respond within a predetermined period of time.

A redirected URL handler portion 55 is used for following redirection of an URL through a plurality of redirections to an ultimate destination without maintaining intermediate pages. The redirected URL handler portion 55 provides an URL for the user of the ultimate document.

As an illustrative example, a source page or database 2 may link to an intermediate document, which in turn links to the desired document. The use of a redirecting URL may allow a database 2 to track which documents are retrieved by the user.

The document storage and retrieval portion 38 may further comprise a source URL portion 56, an ultimate URL portion 57, and a document aging portion 70. The source URL portion 56 is for retaining a URL associated with of each one of a plurality of databases 2 providing documents to the system 10. The ultimate URL portion 57 is similarly used for retaining URL associated with each one of a plurality of ultimate destinations obtained through the redirected URL handler portion 55. The document aging portion 70 is for determining if a current version of a document is available from the document storage and retrieval portion 38 or if the document must be retrieved from another source through the network connectivity portion 34.

The document aging portion 70 may still further include an aging parameter 71, an age module 72, and a modification module 73. The aging parameter 71 is used for selecting a predetermined maximum age for a document to be considered current. The age module 72 determines when the document was retrieved from a source and if the age of the document exceeds the age parameter 71. The modification module 73 interrogates a server about any changes made to the document since the document was previously retrieved.

The modification module 73 may use an entity tag to determine if the document has been modified. The modification module 73 may also use a last-modified-since tag, especially if the server does not support use of the entity tag.

A scoring portion 75 is used for evaluating each one of the plurality of documents for relevance against a query provided by the user. The scoring portion 75 provides a numeric representation of relevance for the user.

In use, the user submits a query or a series of queries to be submitted to a plurality of databases. The capture module matches the query to a database search listing and selects only the databases that have been previously determined to be relevant for the specific query from the user. If multiple queries are to be submitted then the queries are queued. The executory module obtains a thread count parameter used to determine a maximum number of simultaneous threads to be used by the system. The capture module then begins to establish multiple threads to the executory module for the bi-directional communication between the system and a network such as the Internet.

The thread manager establishes the thread between the capture and executory module. The thread manager also monitors the threads for completion of document retrieval and a time-out condition. After all of the relevant documents for a given database have been retrieved or the database has timed-out, the thread manager terminates the thread. If another database is to be queried, and the maximum number of threads is not already established, the thread manager will create a new thread. Each thread is created for a specific database, and when that database is finished the thread is terminated.

An initial results page is returned by the database being queried. The results page lists the relevant documents available through that database, and may include a next page link to continue listing relevant documents. The executory module follows the links to the relevant documents and retrieves the documents one at a time. Each document is evaluated before it is stored. The evaluation may include comparisons with an exclusion list, inclusion list, and a scoring function. If the document contains any term on the exclusion list the document is deleted and the executory module retrieves the next document. If an inclusion list is used, any document that does not contain at least one of the terms listed on the inclusion list is deleted and the executory module obtains the next document. If a predefined minimum score is not achieved for the document, the document is also deleted. If a document passes all of the evaluation steps it is passes to the document storage and retrieval portion to be stored.

The stored document is then passed to the capture portion. If the capture portion requests a document rather than simply passing a query the document storage and retrieval portion is checked to determine if the document is available without downloading.

The check of the document storage and retrieval portion may also include a document aging portion. The document aging portion verifies that a document is available in the document storage and retrieval portion. If the document is available, the age of the document is determined. Preferably if the document is less than 5 to 10 days old it is considered current. If the document is older than the predetermined limit, then the server responsible for that document on the network is queried to see if the document has been modified. If the document has been modified it is downloaded and stored in the document storage and retrieval portion.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for efficiently controlling and capturing dynamic database content comprising:
   obtaining a query from a user, said query to be used to search for relevant information in a specified area of subject matter;
   pre-processing said query, including:
      obtaining a database search listing, said database search listing identifying a plurality of candidate databases determined to be relevant for specified areas of subject matter, and format information indicating a query format to be used for querying at least one of the candidate databases;
      comparing said query to said database search listing to determine best matches from among the candidate databases, the matches representing a set of most relevant databases to submit said query;

routing said query to the set of most relevant databases, including formatting said query based on the format information such that each one of said most relevant databases uses said query to locate relevant information for the user;

obtaining results from each one of said set of most relevant databases;

processing said results; and storing said results for use and analysis by the user.

2. The method of claim 1, wherein said pre-processing further comprises:

building a query queue to store each one of a plurality of queries until each one of said queries is routed to said plurality of databases;

queuing said plurality of queries to be submitted to each one of said set of most relevant databases; and routing each query in turn to each one of said set of most relevant databases.

3. The method of claim 1, wherein said processing said results further comprises:

obtaining an exclusion list detailing terms, phrases, and sources to be excluded from responses to said query;

comparing each responses associated with said query to said exclusion list;

deleting any responses which match terms, phrases, and sources on said exclusion list.

4. The method of claim 1, wherein said processing said results further comprises:

obtaining an inclusion list detailing terms, phrases, and sources which must be contained in each response to said query;

comparing each response associated with said query to said inclusion list;

deleting any response which does not include terms, phrases, and sources on said inclusion list.

5. The method of claim 1, wherein said processing said results further comprises:

scoring each document returned from each of said databases for relevance compared to said query;

recording a plurality of scores, each score associated with one of said responses from each one of said plurality of databases;

obtaining a minimum acceptable score for narrowing the documents to be considered;

comparing each one of said plurality of scores with said minimum acceptable score; and deleting documents which have an associated score numerically less than said minimum acceptable score.

6. The method of claim 1, wherein routing said query to the set of most relevant databases, and obtaining the results from each one of said set of most relevant databases includes executing a plurality of distinct threads, each thread corresponding to a different one of the databases of said set of most relevant databases.

* * * * *